(12) United States Patent
Jang et al.

(10) Patent No.: US 12,478,402 B2
(45) Date of Patent: Nov. 25, 2025

(54) CATHETER SYSTEM

(71) Applicant: IUCF-HYU (INDUSTRY-UNIVERSITY COOPERATION FOUNDATION HANYANG UNIVERSITY), Seoul (KR)

(72) Inventors: Gun Hee Jang, Seoul (KR); Jongyul Kim, Seoul (KR); Won Seo Lee, Yongin-si (KR); Jimin Park, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 976 days.

(21) Appl. No.: 17/630,381

(22) PCT Filed: Jul. 3, 2020

(86) PCT No.: PCT/KR2020/008714
§ 371 (c)(1),
(2) Date: Jan. 26, 2022

(87) PCT Pub. No.: WO2021/020751
PCT Pub. Date: Feb. 4, 2021

(65) Prior Publication Data
US 2022/0280182 A1     Sep. 8, 2022

(30) Foreign Application Priority Data

Jul. 26, 2019 (KR) .................. 10-2019-0090845
Aug. 22, 2019 (KR) .................. 10-2019-0103000

(51) Int. Cl.
*A61B 17/3207*     (2006.01)
*A61B 34/00*       (2016.01)
(Continued)

(52) U.S. Cl.
CPC ...... *A61B 17/320758* (2013.01); *A61B 34/73* (2016.02); *A61M 25/0127* (2013.01);
(Continued)

(58) Field of Classification Search
CPC . A61B 17/320758; A61B 34/73; A61B 34/30; A61B 2017/00477;
(Continued)

(56) References Cited

U.S. PATENT DOCUMENTS

2015/0342682 A1* 12/2015 Bowe ............. A61B 17/320758
                                                      606/127
2017/0071622 A1*  3/2017 Jang ....................... A61M 31/00
(Continued)

FOREIGN PATENT DOCUMENTS

JP      2017-520377 A     7/2017
KR    1020100012394 A     2/2010
(Continued)

OTHER PUBLICATIONS

International Search Report for PCT/KR2020/008714 dated Oct. 6, 2020 (PCT/ISA/210).

*Primary Examiner* — James D Ponton
*Assistant Examiner* — John A Doubrava
(74) *Attorney, Agent, or Firm* — Sughrue Mion, PLLC

(57) ABSTRACT

Disclosed is a catheter system. The catheter system includes: a catheter module including a catheter and a first fastening magnet coupled to a tip of the catheter; and a magnetic robot
(Continued)

including a second fastening magnet magnetically coupled to the first fastening magnet, and coupled to and released from the catheter module.

3 Claims, 6 Drawing Sheets

(51) Int. Cl.
  *A61M 25/01* (2006.01)
  *A61B 17/00* (2006.01)
(52) U.S. Cl.
  CPC ........... *A61B 2017/00477* (2013.01); *A61B 2017/00557* (2013.01); *A61B 2017/00876* (2013.01)
(58) Field of Classification Search
  CPC ........... A61B 2017/00557; A61B 2017/00876; A61B 2017/00345; A61B 2017/22067; A61B 2017/22079; A61B 2017/320775; A61B 2034/301; A61B 2034/303; A61B 2217/005; A61B 2017/12086; A61M 25/0127; A61M 25/0116; A61F 2/958
  See application file for complete search history.

(56) References Cited

U.S. PATENT DOCUMENTS

| 2020/0229957 A1* | 7/2020 | Bardsley | ................ A61F 2/966 |
| 2020/0246087 A1 | 8/2020 | Jang et al. | |

FOREIGN PATENT DOCUMENTS

| KR | 10-2011-0116968 A | 10/2011 |
| KR | 10-1217767 B1 | 1/2013 |
| KR | 10-1379859 B1 | 4/2014 |
| KR | 10-2014-0077899 A | 6/2014 |
| KR | 10-1749586 B1 | 6/2017 |
| KR | 10-1818400 B1 | 1/2018 |
| WO | 2019031678 A1 | 2/2019 |

* cited by examiner

CATHETER SYSTEM

CROSS REFERENCE TO RELATED APPLICATIONS

This application is a National Stage of International Application No. PCT/KR2020/008714 filed Jul. 3, 2020, claiming priorities based on Korean Patent Application No. 10-2019-0090845 filed Jul. 26, 2019 and Korean Patent Application No. 10-2019-0103000 filed Aug. 22, 2019.

TECHNICAL FIELD

The present invention relates to a catheter system, and more particularly, to a catheter system capable of deploying a magnetic robot by using a catheter module.

BACKGROUND ART

In order to treat vascular disease at a narrowed or blocked portion due to thrombosis or the like, it is common to proceed with coronary angioplasty in a sequence of inserting a catheter through the femoral artery, dilating blood vessels by manual operation of a doctor, and installing an instrument capable of maintaining the dilated blood vessels. However, it is difficult to apply the above procedure to complex blood vessels, due to the structural characteristics of the catheter, and the success of the procedure significantly depends on the skill of the doctor.

Recently, researches on a vascular treatment magnetic robot that can be operated wirelessly are being actively conducted in order to overcome the disadvantages of the catheter, however, most of the magnetic robots having been developed so far are single module units, and mainly swim and move without touching intravascular walls or move using a frictional force generated by contacting the intravascular walls. Under the environment where diameters vary, pulsations occur, blood vessels move, or the like, there is a limit to smoothly operating the magnetic robot as well as maintaining positions and postures thereof.

In addition, the previously developed wireless magnetic robots for vascular treatment have not considered bloodstream. Since the wireless magnetic robot driven in blood vessels is mounted with a micro-sized magnet, a generated propulsive force is insufficient to beat the bloodstream. Accordingly, it is very difficult to deliver the robot to the lesion, and the risk of loss of the wireless magnetic robot is very high in the process of delivery and retrieval. In addition, even when reaching the lesion, it is difficult to perform the therapeutic function due to the bloodstream. In order for the wireless magnetic robot to safely perform the therapeutic function in the human body and to be retrieved, there is a need for a catheter capable of selectively separating and fastening the robot to deliver the robot to the lesion and assisting the therapeutic function of the wireless magnetic robot.

DISCLOSURE

Technical Problem

The present invention relates to a catheter system capable of using a catheter module to deploy a magnetic robot to a lesion area and retrieve the magnetic robot.

Technical Solution

The catheter system according to the present invention includes: a catheter module including a catheter and a first fastening magnet coupled to a tip of the catheter; and a magnetic robot including a second fastening magnet magnetically coupled to the first fastening magnet, and coupled to and released from the catheter module.

In addition, the catheter system further includes a cylindrical fastening member fixedly coupled to the first fastening magnet, formed in an inner surface thereof with a coupling groove, and formed of a non-magnetic material, wherein the second fastening magnet may be formed on an outer circumferential surface thereof with a coupling protrusion fastened to the coupling groove.

In addition, the catheter may be formed with an internal flow path, and the first fastening magnet may be formed therein with a connection flow path that connects the inner flow path to an inner space of the fastening member.

In addition, the magnetic robot may further include: a body having a front end provided with a drill tip, and a rear end to which the first fastening magnet is coupled; a cylindrical driving magnet coupled to the body between the drill tip and the first fastening magnet; and a plurality of legs provided along a circumference of the body in an area between the drill tip and the driving magnet, and an area between the driving magnet and the first fastening magnet, formed of a flexible material, and having one end coupled to an outer circumferential surface of the body.

In addition, the catheter module may further include a coupling balloon provided along an outer circumferential surface of the catheter, and the magnetic robot may further include a body coupled to the second fastening magnet along the outer circumferential surface thereof, and sequentially formed inward from a rear end thereof with an opening, a first fastening groove, and a second fastening groove, in which the first fastening magnet is located in the second fastening groove, and the coupling balloon may be located in the first fastening groove while the catheter module is coupled to the magnetic robot.

In addition, the first fastening groove may have a diameter than larger a diameter of the catheter, and the opening may have a diameter larger than the catheter and smaller than an expanding state of the coupling balloon.

In addition, the body may be provided at a front end thereof with a drill tip, and the magnetic robot may further include a plurality of legs provided along a circumference of the body in an area between the second fastening magnet and the drill tip and an area between the second fastening magnet and the rear end, formed of a flexible material, and having one end coupled to an outer circumferential surface of the body.

Advantageous Effects

According to the present invention, the magnetic robot can be coupled to the catheter module and deployed to the lesion, the external rotating magnetic field can be applied to allow the magnetic robot to be separated from the catheter module and then perform the process, and the magnetic robot in completion of the process can be retrieved after recombined with the catheter module.

BEST MODE

The catheter system according to the present invention includes: a catheter module including a catheter and a first fastening magnet coupled to a tip of the catheter; and a magnetic robot including a second fastening magnet magnetically coupled to the first fastening magnet, and coupled to and released from the catheter module.

MODE FOR INVENTION

Hereinafter, exemplary embodiments of the present invention will be described in detail with reference to the accompanying drawings. However, the technical idea of the present invention is not limited to the exemplary embodiments described herein and may be embodied in other forms. Further, the embodiments disclosed thoroughly and completely herein may be provided such that the idea of the present invention can be fully understood by those skilled in the art.

In the specification herein, when one component is mentioned as being on other components, it signifies that the one component may be placed directly on the other components or a third component may be interposed therebetween. Further, in drawings, thicknesses of films and regions may be exaggerated to effectively describe the technology of the present invention.

Further, the terms such as first, second, and third are used to describe various components in various embodiments of the present specification, however, the components should not be limited by the terms. The above terms are used merely to distinguish one component from another. Accordingly, a first component referred to in one embodiment may be referred to as a second component in another embodiment. Each embodiment described and illustrated herein may also include a complementary embodiment. In addition, the term "and/or" is used herein to include at least one of the components listed before and after the term.

In the specification, the singular expression includes a plural expression unless the context clearly means otherwise. In addition, it will be understood that the term such as "include" or "have" herein is intended to designate the presence of feature, number, step, component, or a combination thereof recited in the specification, and does not preclude the possibility of the presence or addition of one or more other features, numbers, steps, components, or combinations thereof. In addition, the term "connection" is used herein to include both indirectly connecting a plurality of components and directly connecting the components. In addition, in the following description of the embodiments of the present invention, the detailed description of known functions and configurations incorporated herein will be omitted when it possibly makes the subject matter of the present invention unclear unnecessarily.

Figure 1:
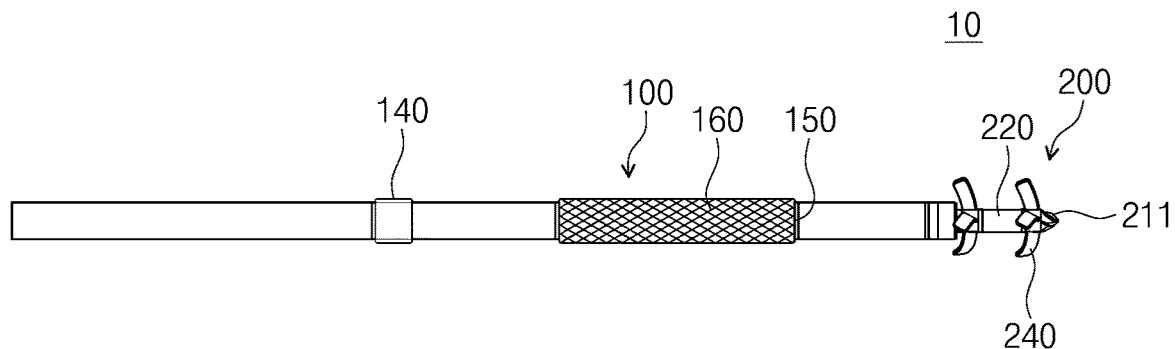
FIG. 1 is a view showing a catheter system according to the first embodiment of the present invention.
Figure 2:
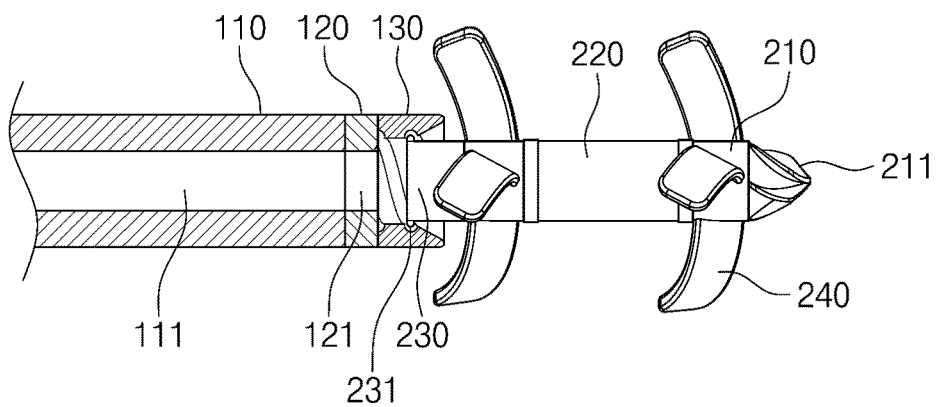
FIG. 2 is a view showing a coupling state between a catheter module and the magnetic robot.
Figure 3:
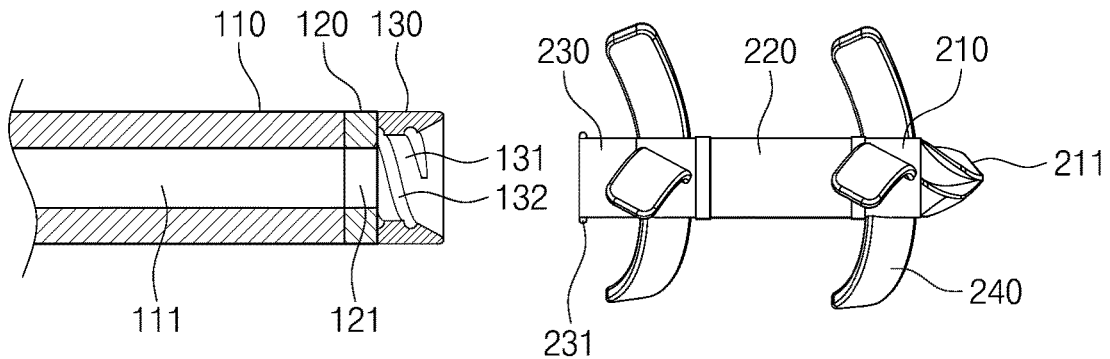
FIG. 3 is a view showing a separated state between the catheter module and the magnetic robot.

FIG. 1 is a view showing a catheter system according to the first embodiment of the present invention. FIG. 2 is a view showing a coupling state between a catheter module and the magnetic robot. FIG. 3 is a view showing a separated state between the catheter module and the magnetic robot.

Referring to FIGS. 1 to 3, the catheter system 10 may deliver a magnetic robot 200 to a desired position in various fluid environments such as tubular tissues of the body, industrial pipes, and test tubes, and may perform a process by driving the magnetic robot 200. In the embodiments, treatment of a lesion within a body blood vessel using the catheter system 10 will be described as an example.

The catheter system 10 includes a catheter module 100, a magnetic robot 200, and a magnetic field generator (not shown).

The catheter module 100 deploys the magnetic robot 200 to the vicinity of the lesion. The catheter module 100 includes a catheter 110, a first fastening magnet 120, a fastening member 130, a suction unit (not shown), a support balloon 140, a stent deployment balloon 150, and a stent 160.

The catheter 110 has a tubular shape having a predetermined length, and is inserted into the body's blood vessels. The catheter 110 is formed of a deformable flexible material, and an internal flow path 111 is formed therein. The drug may be delivered into the blood vessel through the internal flow path 111. In addition, foreign substances in blood vessels may be sucked through the internal flow path 111.

The first fastening magnet 120 is fixedly coupled to a front end of the catheter 110. The first fastening magnet 120 has a diameter corresponding to the catheter 110, and has a cylindrical shape with a connection flow path 121 formed therein, in which the N pole and the S pole are disposed to face each other with the connection flow path 121 interposed therebetween.

The fastening member 130 is fixedly coupled to a front end of the first fastening magnet 120. The fastening member 130 is formed of a non-magnetic material and provided in a cylindrical shape having a diameter corresponding to that of the first fastening magnet 120. An inner flow path 131 is formed inside the fastening member 130. The internal flow path 131 is connected to the internal flow path 111 of the catheter 110 through the connection flow path 121 of the first fastening magnet 120. The internal flow path 111 may have a diameter gradually increased from one end of the fastening member 130 adjacent to the first fastening magnet 120 toward the other end. A coupling groove 132 is formed on an inner surface of the fastening member 130. The coupling groove 132 may be formed in a spiral shape along a circumference of the inner surface of the fastening member 130.

The suction unit (not shown) is provided at a rear end of the catheter 110, and applies a negative pressure to the internal flow path 111 of the catheter 110. Due to the applied negative pressure, thrombus fragments inside the blood vessel may be introduced into the catheter 110 through the internal flow path 131 of the coupling member 130 and the connection flow path 121 of the first coupling magnet 120.

The support balloon 140 is coupled to the catheter 110 at a point spaced a predetermined distance backward from a tip of the catheter 110. The support balloon 140 may expand and contract according to injection of a fluid from the outside. The support balloon 140 in the expanding state is supported on an inner wall of the blood vessel. When the support balloon 140 expands, the flow of blood in the blood vessel is blocked.

The stent deployment balloon 150 is coupled to the catheter 110 between the tip of the catheter 110 and the support balloon 140. The stent 160 is provided along a circumference of the stent deployment balloon 150 in a contracting state. The stent deployment balloon 150 may expand according to injection of the fluid from the outside, and the stent 160 may expand by expansion of the stent deployment balloon 150.

The magnetic robot 200 may be deployed to the vicinity of the lesion while being coupled to the catheter module 100, and may move and remove the lesion under the control of the magnetic field generator while being separated from the catheter module 100.

The magnetic robot 200 includes a body 210, a driving magnet 220, a second fastening magnet 230, and a leg 240.

The body 210 has a rod shape having a predetermined length and provided at a tip thereof with a drill tip 211. The body 210 is formed of a non-magnetic material.

The driving magnet 220 is provided along a circumference of the body 210 between the drill tip 211 and a rear end of the body 210. The driving magnet 220 has a cylindrical shape and the body 210 is inserted into an inner space thereof. The driving magnet 220 has the N pole and the S pole disposed to face each other with the body 210 interposed therebetween.

The second fastening magnet 230 is fixedly coupled to the rear end of the body 210. The second fastening magnet 230 has a diameter corresponding to the driving magnet 220. A coupling protrusion 231 is formed on an outer circumferential surface of the second fastening magnet 230. The coupling protrusion 231 is coupled to a fastening groove 132 of the fastening member 130.

A plurality of legs 240 are provided along the circumference of the body 210 in an area between the drill tip 211 and the driving magnet 220 and an area between the driving magnet 220 and the first fastening magnet 230, respectively. The leg 240 has one end coupled to an outer circumferential surface of the body 210. The leg 240 is formed of a flexible material having a plate shape. The leg 240 is disposed diagonally with respect to a rotation axis of the body 210. The leg 240 generates a driving force while being rotated together with the body 210.

The magnetic field generator generates an external rotating magnetic field outside the body. The external rotating magnetic field rotates the magnetic robot 200 to separate the magnetic robot 200 from the catheter module 100, and generates a driving force for enabling the magnetic robot 200 to move within the blood vessel.

FIGS. 4 to 9 are views sequentially showing operation processes of the catheter system according to the first embodiment of the present invention.

Figure 4:
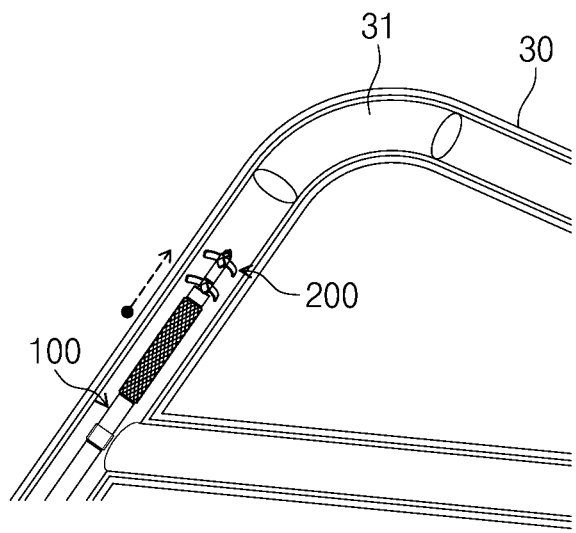
FIGS. 4 to 9 are views sequentially showing operation processes of the catheter system according to the first embodiment of the present invention.

Referring to FIG. 4, the catheter module 100 moves along the blood vessel 30 to the vicinity of a lesion 31 in a state in which the magnetic robot 200 is coupled to the catheter module 100.

Figure 5:
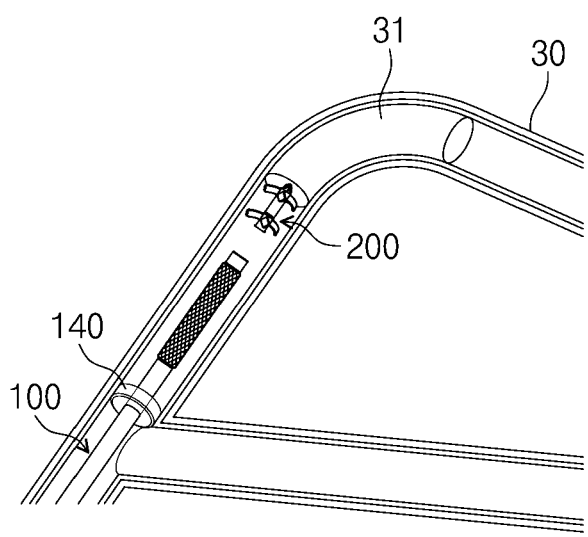

Referring to FIG. 5, the support balloon 140 of the catheter module 100 expands and is supported on the inner wall of the blood vessel, and accordingly, the flow of blood is blocked. The external rotating magnetic field is applied to the driving magnet 220 to generate a rotational force in the magnetic robot 200. While a fastening protrusion 231 of the second fastening magnet 230 is rotated along the coupling groove 132 of the fastening member 130 by the rotational force, the mechanical coupling between the second fastening magnet 230 and the fastening member 130 is released. Simultaneously, the magnetic coupling between the first fastening magnet 120 and the second fastening magnet 230 is released. The magnetic robot 200 released from the catheter module 100 moves with the driving force generated by the legs 240 while being rotated.

Figure 6:
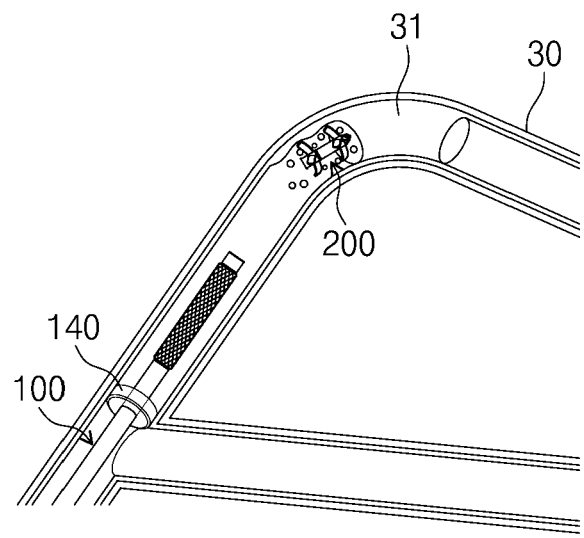

Referring to FIG. 6, the magnetic robot 200 performs a drilling process on the lesion 31 by using the drill tip 211. The thrombus fragments generated by the drilling process are sucked into the catheter 110 through the internal flow path 131 of the fastening member 130 and the connection flow path 121 of the first fastening magnet 120, by the negative pressure applied to the inner flow path 111 of the catheter 110 from the suction unit.

Figure 7:
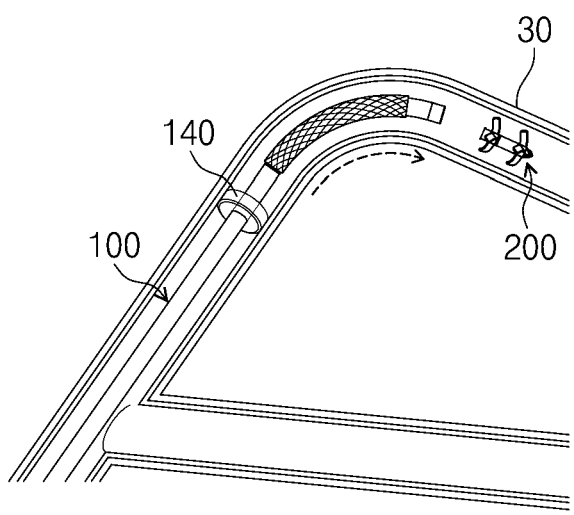

Referring to FIG. 7, when the removal of the lesion 31 is completed, the catheter module 100 moves to a point in which the magnetic robot 200 is located.

Figure 8:
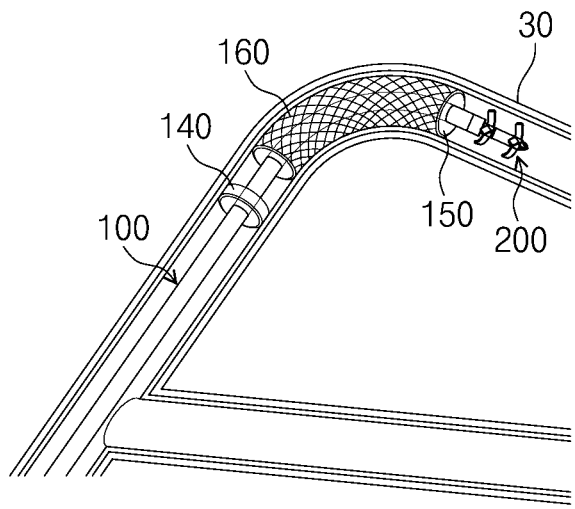

Referring to FIG. 8, the magnetic robot 200 is recombined with the catheter module 100 under the control of the external rotating magnetic field. With regard to the external rotating magnetic field, a rotating magnetic field in the reverse direction of the rotating magnetic field applied when the coupling between the magnetic robot 200 and the catheter module 100 is released may be applied. The magnetic robot 200 is primarily coupled to the catheter module 100 by the coupling between the coupling protrusion 231 of the second coupling magnet 230 and the coupling groove 131 of the coupling member 130, and secondarily coupled to the catheter module 100 by the magnetic coupling between the first fastening magnet 120 and the second fastening magnet 230. At the point in which the lesion is removed, the stent deployment balloon 150 expands to deploy the stent 160. When the stent 160 is deployed, the blood vessel 30 expands.

Figure 9:
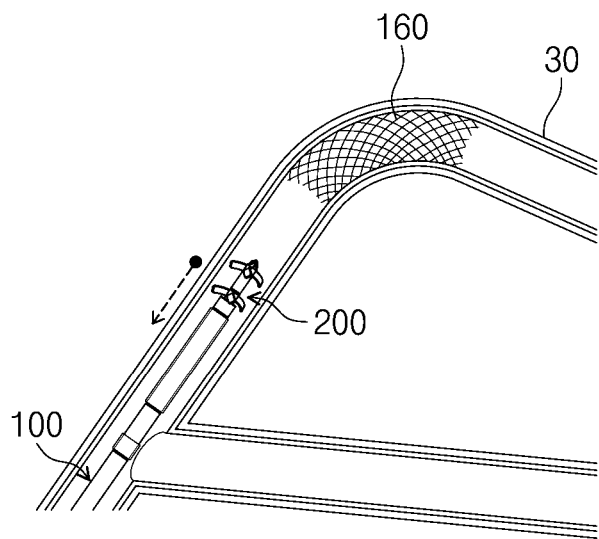

Referring to FIG. 9, the stent deployment balloon 150 contracts and the catheter module 100 and the magnetic robot 200 are recovered outside the body.

Figure 10:
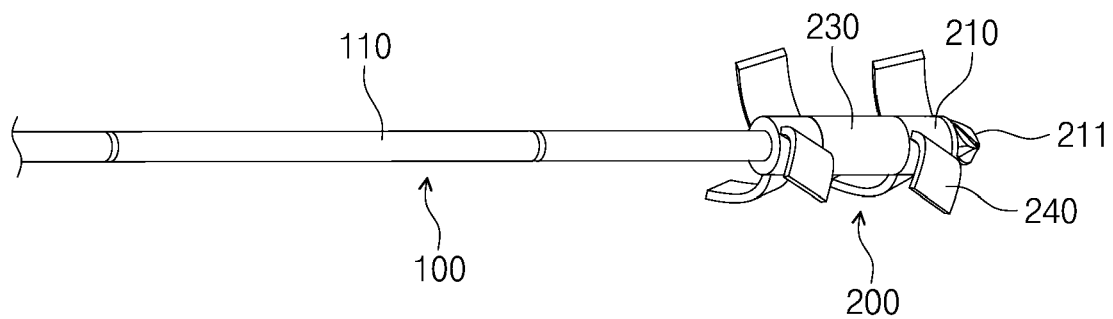
FIG. 10 is a view showing a catheter system according to a second embodiment of the present invention.
Figure 11:
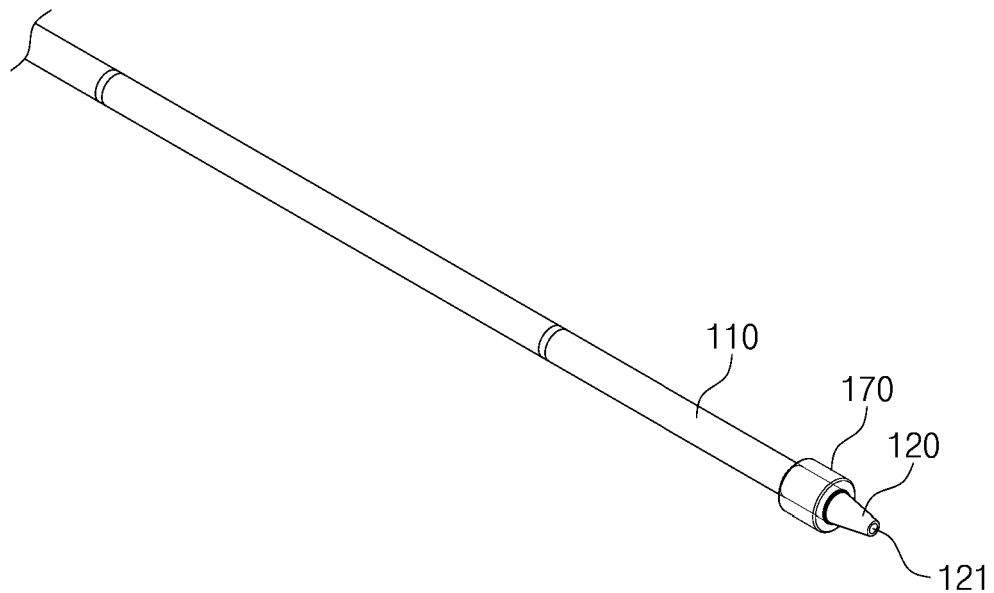
FIG. 11 is a view showing the catheter module of FIG. 10.
Figure 12:
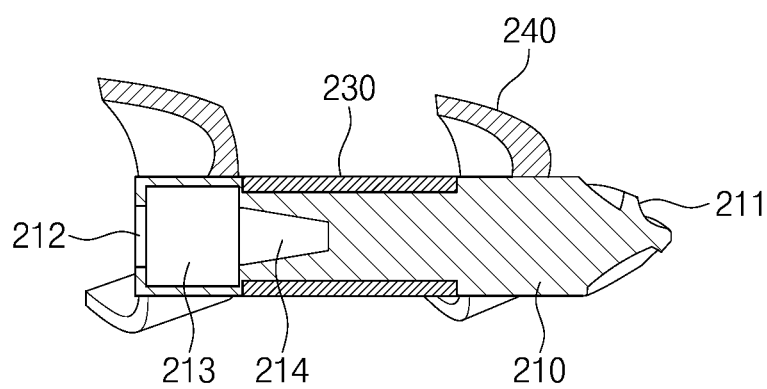
FIG. 12 is a sectional view showing the magnetic robot of FIG. 10.
Figure 13:
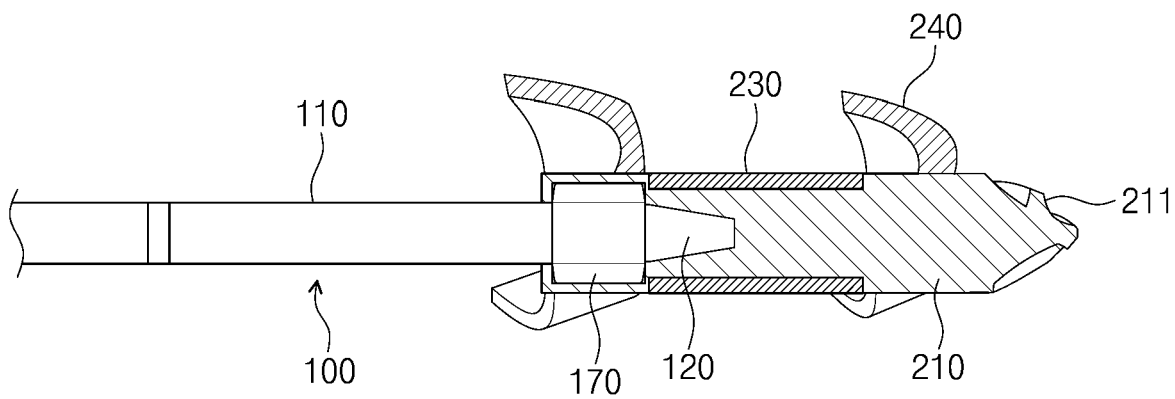
FIG. 13 is a sectional view showing the coupling state between the catheter module and the magnetic robot of FIG. 10.
Figure 14:
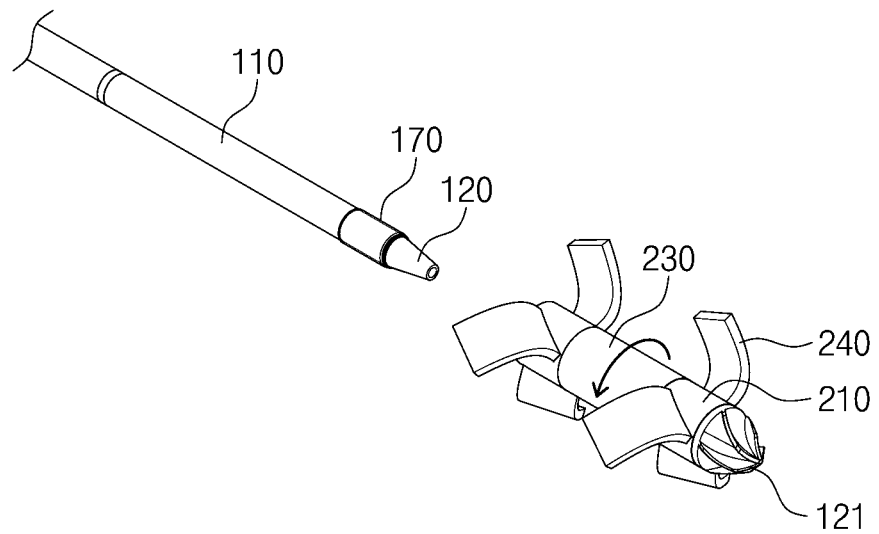
FIG. 14 is a view showing the separated state between the catheter module and the magnetic robot of FIG. 10.

FIG. 10 is a view showing a catheter system according to a second embodiment of the present invention. FIG. 11 is a view showing the catheter module of FIG. 10. FIG. 12 is a sectional view showing the magnetic robot of FIG. 10. FIG. 13 is a sectional view showing the coupling state between the catheter module and the magnetic robot of FIG. 10. FIG. 14 is a view showing the separated state between the catheter module and the magnetic robot of FIG. 10.

Referring to FIGS. 10 to 14, the catheter module 100 includes a catheter 110, a first fastening magnet 120, and a coupling balloon 170. Although not shown in the drawing, the catheter module 100 may further include the support balloon 140, the stent deployment balloon 150, and the stent 160 that are described in the first embodiment.

The first fastening magnet 120 is coupled to a tip of the catheter 110. The first fastening magnet 120 may have a cone shape in which the diameter is gradually decreased toward the tip. The first fastening magnet 120 has a structure in which the N pole and the S pole are arranged facing each other with a central axis thereof interposed therebetween. An internal flow path 121 may be formed in the first fastening magnet 120. The inner flow path is connected to the inner flow path of the catheter 110. Thrombus fragments may be sucked into the internal flow path of the catheter 110 through the internal flow path of the first fastening magnet 120.

The coupling balloon 170 is coupled to the catheter 110 at a rear of the first fastening magnet 120. The coupling balloon 170 is provided along the circumference of the catheter 110. The coupling balloon 170 may expand and contract according to injection of a fluid from the outside.

The magnetic robot 200 includes a body 210, a second fastening magnet 230, and a leg 240.

A drill tip 211 is provided at a tip of the body 210. The body 210 is formed of a non-magnetic material. The body 210 is formed at a rear end thereof with an opening 212, a first fastening groove 213, and a second fastening groove 214. The opening 212 is formed at the rear end of the body 210, and the first fastening groove 213 and the second fastening groove 214 are formed inside the body 210. The opening 212, the first fastening groove 213, and the second fastening groove 214 are sequentially and inward formed from the rear end of the body 210 and communicate with each other. The opening 212 has a diameter larger than the diameter of the catheter 110. The first fastening groove 213 has a diameter than the diameter of the opening 212. The first fastening groove 213 may have a diameter corresponding to the expanding state of the coupling balloon 170. The second fastening groove 214 may have a shape corresponding to the first fastening magnet 120.

The second fastening magnet 230 is provided along the circumference of the body 210. The second fastening magnet 230 has a cylindrical shape and the body is inserted into an inner space thereof. The second fastening magnet 230 has the N pole and the S pole disposed to face each other with the body 210 interposed therebetween. The second fastening magnet 230 forms a magnetic force together with the first fastening magnet 120 while the catheter module 100 and the magnetic robot 200 are coupled to each other.

A plurality of legs 240 are provided along the circumference of the body 210 in an area between the drill tip 211 and the second fastening magnet 230 and a rear area of the second fastening magnet 230, and have one end coupled to the body 210. The leg 240 is formed of a flexible material having a plate shape. The leg 240 is disposed diagonally with respect to a rotation axis of the body 210. The leg 240 generates a driving force while being rotated together with the body 210.

Hereinafter, the coupling and releasing processes between the catheter module 100 and the magnetic robot 200 will be described.

The catheter 110 is inserted into the opening 212 of the body 210 while the coupling balloon 170 contracts. The first fastening magnet 120 is located in the second fastening groove 214 and forms a magnetic force together with the second fastening magnet 230. The first fastening magnet 120 forms an attractive force with the second fastening magnet 230. The coupling balloon 170 is located in the first fastening groove 213, and expands in the first fastening groove 213 by the fluid injected from the outside. Due to the expansion of the coupling balloon 170, the catheter 110 is restricted from being separated from the body 210. The catheter module 100 to which the magnetic robot 200 is coupled through the above process deploys the magnetic robot 200 to the vicinity of the lesion.

When the magnetic robot 200 enters the vicinity of the lesion 31, the magnetic robot 200 is separated from the catheter module 100. First, the coupling balloon 170 contracts and a rotational force is generated in the magnetic robot 200 by the external rotating magnetic field. The magnetic coupling between the first fastening magnet 120 and the second fastening magnet 230 is released by the rotational force of the magnetic robot 200. The magnetic robot 200 is separated from the catheter module 100 and rotated in the blood vessel to generate a driving force.

Although the present invention has been described in detail using exemplary embodiments, the scope of the present invention is not limited to the specific embodiments, and shall be interpreted by the appended claims. In addition, it will be apparent that a person having ordinary skill in the art may carry out various deformations and modifications for the embodiments described as above within the scope without departing from the present invention.

INDUSTRIAL APPLICABILITY

The catheter system according to the present invention may be used to treat constricted and narrowed or blocked vascular diseases due to thrombosis and the like.

The invention claimed is:

1. A catheter system comprising:
   a catheter module including a catheter and a first fastening magnet coupled to a tip of the catheter; and
   a magnetic robot including a second fastening magnet magnetically coupled to the first fastening magnet, and configured to be coupled to and decoupled from the catheter module,
   wherein the catheter module further includes a coupling balloon provided along an outer circumferential surface of the catheter,
   wherein the magnetic robot further includes a body into which an opening, a first fastening groove, and a second fastening groove are sequentially formed from a rear end of the body,
   wherein the second fastening magnet is coupled to the body along an outer circumferential surface of the body, and
   wherein the first fastening magnet is located in the second fastening groove, and the coupling balloon is located in the first fastening groove while the catheter module is coupled to the magnetic robot.

2. The catheter system of claim 1, wherein the first fastening groove has a diameter larger than a diameter of the catheter, and the opening has a diameter larger than the catheter and smaller than an expanding state of the coupling balloon.

3. The catheter system of claim 1, wherein the body is provided at a front end thereof with a drill tip, and the magnetic robot further includes a plurality of legs provided along a circumference of the body in an area between the second fastening magnet and the drill tip and an area between the second fastening magnet and the rear end, formed of a flexible material, and having one end coupled to an outer circumferential surface of the body.

* * * * *